3,814,821
METHODS FOR PROTECTING THE COLOR OF CUT BONE SURFACES IN FRESH AND FROZEN MEAT
Robert J. Oliver, Smithfield, Va., and Earl W. Turner, Port Chester, N.Y., assignors to International Telephone and Telegraph Corporation, Nutley, N.J.
Filed Feb. 23, 1972, Ser. No. 228,681
Int. Cl. A22c *18/00;* A23b *1/00*
U.S. Cl. 426—265       3 Claims

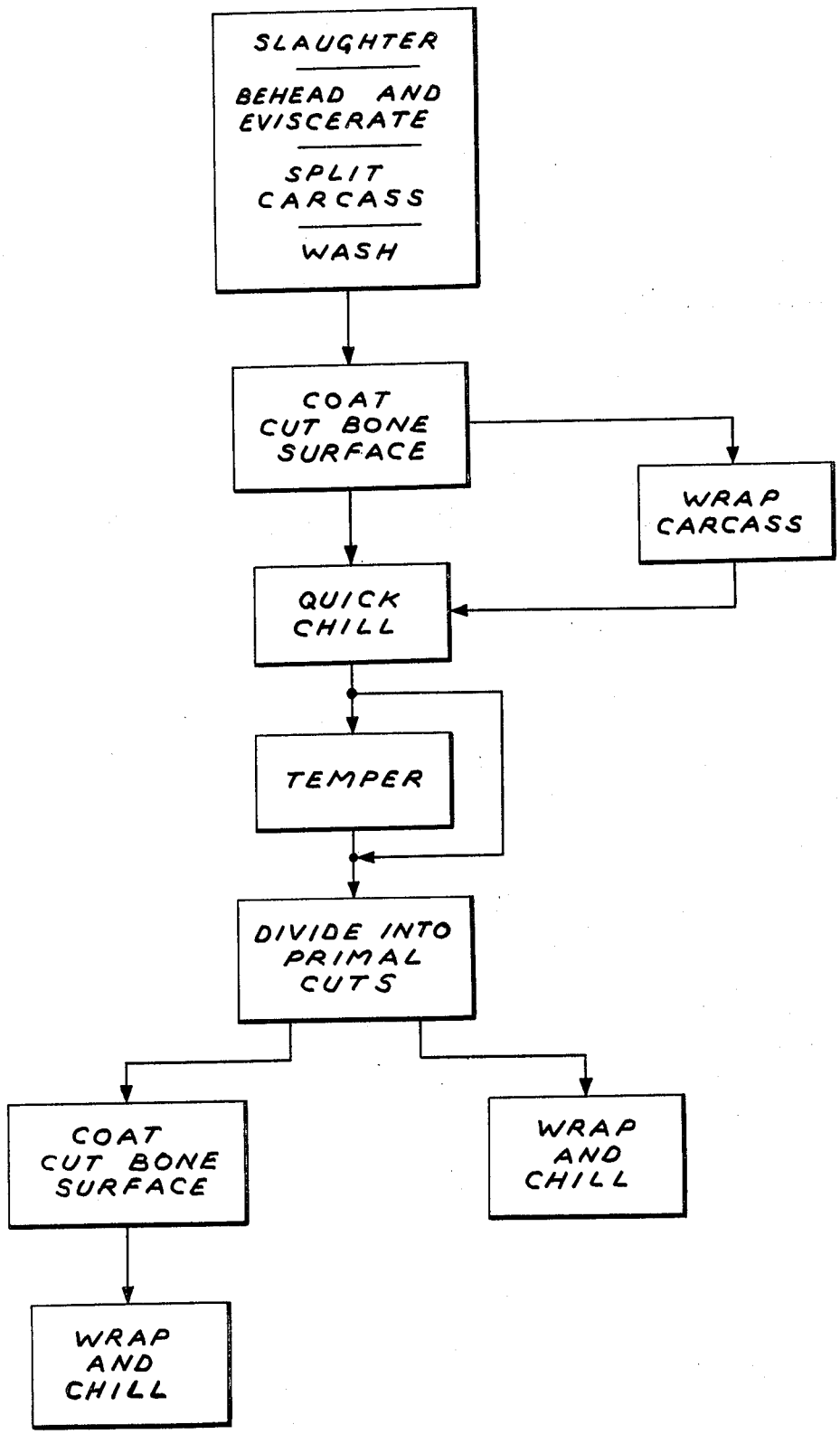

ABSTRACT OF THE DISCLOSURE

A method for protecting the natural red color of the cut bone surface of both chilled and frozen meat to prevent "bone darkening" due to discoloration of the marrow on the cut bone surfaces. The present invention describes methods for coating the cut bone surfaces of various cuts of meat products to prevent oxidation of the natural heme pigments in the bone marrow followed by protective packaging for distribution.

BACKGROUND OF THE INVENTION

This invention relates to the application of an edible coating to protect the cut bone surface of fresh chilled and frozen red meats to inhibit or retard oxidation and prevent "bone darkening." "Bone darkening" is caused by the oxidation of hemoglobin and the other heme pigments present in bone marrow and results in the formation of methemoglobin and other metheme compounds with the iron of the heme complex oxidized to the ferric state. This oxidation results in a loss of the red color characteristic of fresh meat, specifically, the cut bone surface, with the formation of brown to black discoloration of the bone surface. Discoloration of the cut bone surface with concomitant development of rancid off-flavors results in loss of consumer acceptance and a lowering in the market value of wholesale and retail meat cuts, particularly with fresh pork and beef.

The development of "bone darkening" due to oxidation of the bone marrow pigments is accelerated when the carcass, wholesale or retail cuts, are "hard-chilled" or frozen to improve the microbiological keeping quality of meats for sales distribution. "Bone darkening" and rancidity can be inhibited according to the invention by coating the cut bone surface with a protective film of edible material prior to "hard-chilling" or freezing, followed by the use of protective packaging for wrapping the half-carcass, quarters, wholesale and retail cuts of pork, beef and lamb.

To explain the nature of the changes involved in "bone darkening" and the reasons for efficacy of the methods described hereinafter, it is of interest to examine the nature of bone marrow and the reactions which can occur unless the exposed bone marrow is protected against oxidation.

The red marrow situated in the ends of the long bones, such as the femur and to a greater extent in the ribs, sternum and vertabrae, is under normal conditions the only source of erythropoiesis, as the process for formation of red blood corpuscles is termed throughout postnatal life. The red pigment contained in red blood cells, erythrocytes, is hemoglobin. Hemoglobin is composed of: (1) a heme moity which contains one molecule of iron in the ferrous or reduced state ($Fe^{++}$), which is bound by a coordinate linkage to a porphyrin molecule; and (2) a globin protein-molecule thus:

Reduced heme ($Fe^{++}$)+globin ⟶ hemoglobin ($Fe^{++}$).
(red pigment)

When hemoglobin is oxidized, the ferrous iron ($Fe^{++}$) in the heme moity of the hemoglobin molecule is oxidized to ferric iron ($Fe^{+++}$) which results in the formation of methemoglobin; and the color changes from red to a brown or dark brown color characteristic of discoloration observed in "bone darkening" on the cut bone surface after the carcass is split:

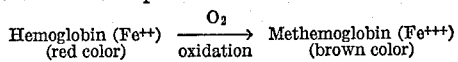

Oxidation of hemoglobin and the other heme pigments in bone marrow is complicated by the presence of unsaturated fats and fatty acids and other lipids which are readily oxidized and which, in turn, can oxidize hemoglobin ($Fe^{++}$), red color, to methemoglobin ($Fe^{+++}$), brown color:

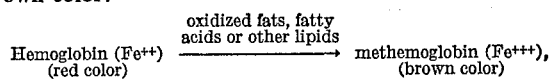

Also methemoglobin ($Fe^{+++}$) can catalyze oxidation of the unsaturated fats and fatty acids present in the bone marrow, and the oxidized fats and oxidized fatty acids then proceed to oxidize hemoglobin ($Fe^{++}$), red color, to methemoglobin ($Fe^{+++}$), brown color. Finally, after several days all the red pigment present in the cut bone surface is oxidized to a brown color, and "bone darkening" occurs with the development of rancid flavors from the oxidized fats, fatty acids and other lipid materials in the following fashion:

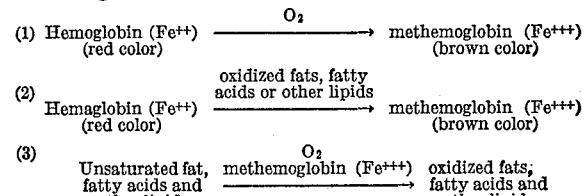

This results in a continuous cycle: reaction (1) and (2) above form methemoglobin ($Fe^{+++}$) which, in turn, catalyzes the oxidation of the fats, fatty acids and other lipids present in the bone marrow, reaction (3), until all the red color of hemoglobin is destroyed.

The rates of oxidation of fats, other lipids and heme pigments are accelerated during freezing and thawing, especially at the eutectic temperature or transition point between the frozen and liquid state. This accelerated rate of oxidation during freezing and thawing is generally believed to be due to a concentration of salts and other solutes and to a closer orientation of the substrate, lipids and the catalyst, hemoglobin in the case of bone marrow. Thus quick chilling or partial freezing of the cut bone surface can result in vary rapid deterioration in color unless the marrow is protected against oxygen by some means.

As described in a co-pending application Charles H. Wallace, Ser. No. 217,025, rapid or quick chilling of hog carcasses is the economically preferred method for processing hogs because the amount of labor and space requirements are reduced; there is less carcass weight loss due to moisture evaporation during chilling; and there is less meat inventory in process. Rapid carcass chilling at subfreezing temperatures, however, has not been practical until now due to the problem of "bone darkening" of the cut bone surface.

SUMMARY OF THE INVENTION

It is therefore, a principal object of this invention to provide a method for protecting the color of cut bone surfaces.

Another object of the invention is to provide a method to prevent "bone darkening" of cut bone surfaces.

Still a further object of the invention is to provide a method for protecting the cut bone surfaces of various cuts of meat products to prevent oxidation of the natural heme pigments in the bone marrow.

According to the broader aspects of the invention there is provided a method for protecting the cut bone surfaces of fresh and frozen meat by coating the cut bone surface with an oxygen barrier.

BRIEF DESCRIPTION OF THE DRAWING

Other objects and advantages of the invention will be apparent from the following detailed description of the preferred embodiments thereof, reference being made to the sole accompanying drawing, which is a block diagram representing the steps of processing hog in accordance with the invention.

DESCRIPTION OF THE PREFERRED EMBODIMENTS

In accordance with the invention and referring to the drawing, in processing a hog, the hog is stunned, stuck, and bled. The carcass is then placed in a bath of scalding water and de-haired. The carcass is then deheaded and eviscerated, after which it is usually split in two and rough trimmed. The carcasses or carcass halves are washed by tap water under pressure to have an impinging action that will rinse loose hair and blood from the carcasses.

In accordance with the invention and as more particularly described hereinafter, the cut bone surface of the carcasses, or carcass halves are coated with an oxygen barrier. The carcasses may then be wrapped or the wrapping step eliminated and the carcasses are quick chilled according to cited co-pending application.

The carcasses are then tempered while traveling from the cooling facility to the cutting facility where the wrap is removed if used. Alternately, the carcasses may exit directly in the cutting facility and the wrap removed if tempering is not necessary according to the particular chilling procedure.

The cooled carcass is immediately divided in primal cuts usually including hams, picnics, bellies, loins, Boston butts, ribs, fatbacks, and clear plates. The cuts may then be wrapped and chilled in preparation for shipment, or alternately, the cut bone surfaces of the various cuts are coated with an oxygen barrier prior to wrapping and chilling for shipment.

Referring now more particularly to the wrapping and coating steps in the overall foregoing procedure, it has been discovered the 'bone darkening" of cut bone surfaces can be dramatically reduced or entirely eliminated for the useful storage and retail life of the product by protecting the cut bone surface from oxidation by particular ones or a combination of the following steps:

1. Wrapping the carcass in film prior to chilling.
2. Applying an edible lipid including an edible oil (triglyceride), monoglyceride, diglyceride, acetylated monoglyceride, or glycerol, or edible gels including gelatin, plant gums or xanthan gums, or similar substances, to the cut bone surface either before and/or after chilling the carcass.
3. Incorporating antioxidants in the edible coating applied to the cut bone surface.
4. Using a flexible film rather than "butcher paper" for wrapping the meat cut.

The best results are obtained when the above four methods are combined, but for economic reasons we prefer to use a combination of methods 2, 3 and 4.

The "butcher paper" referred to above is a bleached Kraft paper, waxed with paraffin and is the most commonly used material for wrapping meat cuts.

This invention is illustrated by the following specific examples. It is to be understood that our invention is not to be restricted to the details of these examples.

Hog carcasses were rapidly chilled using mechanically chilled air blast and/or carbon dioxide to achieve temperatures ranging from +15° F. to —80° F. (air temperature) for periods of time ranging from 3½ hours at +15° F. to 45 minutes at —80° F. The carcasses were then tempered in order to thaw the frozen surfaces of the carcasses at temperatures ranging from +35° F. to +45° F. (air temperature) for periods of time ranging from ½ hour to 2½ hours. The carcasses were then cut in the conventional manner to yield hams, loins, picnics, etc.

The cut bone surfaces of the loins, which are normally sold as a fresh meat cut, were protected from oxidation by one or more of the above-mentioned methods either before or after the carcass was chilled. In those cases where the chilling and tempering process did not reduce the internal temperature of the meat cuts to 38° F. or below, the cuts received a secondary chilling treatment after cutting the carcasses.

In most of these production tests the loin was the meat cut chosen for evaluation of cut bone surface color since it normally has the highest economic value and is the cut most effected by "bone darkening" due to the large area of exposed bone surface. The loins in these experiments were boxed and held at 30–32° F. for four to six days and then evaluated for color.

The following films, illustrative of the various compositions, oxygen and moisture permeabilities available were tested:

| Film identification | Manufacturer | Film composition |
| --- | --- | --- |
| Cry O Vac XD525 | W. R. Grace Company, Duncan, S.C. | Cross-linked polyethylene. |
| MS 251 | do | Vinylidene chloride. |
| Carcass wrap resinite | Borden Chemical Co., North Andover, Mass. | Polyvinylchloride (PVC). |
| RMT 67 Resinite | do | Polyvinylchloride. |
| Hy Y gold meat wrap | R. J. Archer, Inc., Aurora, Ohio. | Do. |
| RJR Filmco | do | Do. |
| 100 Maraflex 11-3 (30) | American Can Co., Neenah, Wisconsin. | Nylon-saran coated polyethylene. |
| .0015 clear polyethylene | American Paper Co., Richmond, Virginia. | Polyethylene. |

It was found that all of the above films were more efficacious than "butcher paper" in protecting cut bone surfaces from "bone darkening." RMT 67 Resinite and .0015 clear polyethylene, however, both oxygen permeable films, gave results somewhat superior to the others.

The following edible oils were tested:

Corn oil            Safflower oil
Olive oil           Soybean oil
Cottonseed oil      Sesame oil
Peanut oil          Mineral oil
Lard oil            Oleo oil It was found that all of the above edible oils were efficacious in protecting cut bone surfaces from "bone darkening" whether used with or without antioxidants; although results were better when antioxidants were added. The protection against oxidation rendered by these oils is due in part to their forming a mechanical barrier to atmospheric oxygen, in part to their acting as an adhesive between the cut bone surface and the wrapper used, and in part to their natural $\alpha,\beta$-tocopherol content since this, too, is an antioxidant. $\alpha,\beta$-tocopherol content mg./100 gr.:

Soybean oil _____ 140
Cottonseed oil _____ 90
Corn oil _____ 87
Peanut oil _____ 22

Sesame oil is unusually stable against oxidation in part due to the presence of a phenolic material known as sesamol.

The following antioxidants dissolved in oil were used at the FDA level permitted wherein no one antioxidant exceeded .01% of the weight of the oil and the combination of antioxidants did not exceed .02% of the weight of the oil:

Butylated hydroxyanisole
Butylated hydroxytoluene
Cirtic acid

It was found that the above antioxidants incorporated in edible oil afforded more protection against "bone darkening" than edible oils used without added antioxidants. The antioxidant treated oil was applied in approximate amounts of 2 to 7 grams to the cut bone surfaces of each half carcass.

In addition to using the above listed antioxidants dissolved in oil, chelating agents at permitted FDA levels such as polyphosphates, citric acid, and ethylene diamine tetratacitic acid were used either in aqueous solution or in dry form and found to be efficacious in retarding "bone darkening" of cut bone surfaces.

These different coating materials and/or dry or liquid antioxidant materials were applied using the following methods:

(1) Brushing onto the surface
(2) Spraying
(3) Blowing or rubbing

Example I

The following test is one specific example of using protective steps Nos. 1 and 4:

Four hot hog carcasses that had been subjected to conventional commercial kill floor operations were split in half, and each half carcass was weighed. One-half of each carcass was chilled in a conventional hog cooler along with other hog carcasses using air temperature of +25° F. to +38° F. over a period of 18 hours. The other half of each carcass was fast-chilled in high velocity air at −4° F. for 1½ hours and then tempered in +40° F. air for 1½ hours. Two half carcasses chilled each way were wrapped in Resinite film prior to chilling. The fast-chilled carcasses were cut immediately after tempering while the conventionally chilled carcasses were cut 18 hours after kill. One loin from each chilling treatment was wrapped in Resinite film after cutting while the other loin from each treatment was wrapped in "butcher paper." All loins were held at 30–32° F. prior to evaluation. The following table summarizes the data obtained:

| Chill method | Carcass wrap | Hot ½ carcass weight (lbs.) | Percent carcass shrink during chilling | Wrap used for cut loins | Loin bone color after 5 days |
|---|---|---|---|---|---|
| Fast | Resinite | 72.0 | 0.7 | Resinite | Acceptable. |
| Do | None | 67.5 | 0.7 | Paper | Unacceptable. |
| Do | Resinite | 69.8 | 0.7 | do | Acceptable. |
| Do | None | 63.5 | 0.4 | Resinite | Do. |
| Conventional | Resinite | 86.5 | 0.6 | Paper | Do. |
| Do | None | 84.2 | 1.8 | Resinite | Do. |
| Do | Resinite | 68.7 | 0.7 | do | Do. |
| Do | None | 64.2 | 1.9 | Paper | Do. |

Example II

The following tests is one specific example of using protective methods Nos. 2, 3 and 4:

Four hot hog carcasses that had been subjected to conventional commercial kill floor operations were fast-chilled using high velocity air, mechanically refrigerated to −5° F. to −15° F., for 1¼ hours. They were then tempered in +34° F. to +38° F. air temperature for 1¼ hours. Edible mineral oil was applied to the backbone of one-half of each carcass before chilling by means of a paint brush. Edible mineral oil containing .01% BHA+.003% BHT+.008% citric acid was painted on the backbone of the other half carcasses prior to chilling. (It had previously been ascertained that this method of applying oil results in approximately 7 grams of oil for each half carcass.) After tempering, the carcasses were cut, the loins were wrapped in Resinite film, boxed and stored at +30° F. to +32° F. Since the internal temperature of the loins at the time of cutting ranged from +65° F. to +70° F., 1½ pounds of carbon dioxide pellets were added to each box of four loins to provide additional chilling. Loin bone color after five days:

Loins treated with edible mineral oil alone:
  3 satisfactory
  1 unsatisfactory
Loins treated with edible mineral oil containing antioxidants:
  4 satisfactory The above examples are only two of many tests carried out to evaluate various combinations of the four methods we have found that protect cut bone surfaces from "bone darkening."

The following example is a summary of the results of those many tests:

Example III

Protection of cut bone color on pork loins

| Treatment of cut bone surface | Material used for wrapping chilled pork loins | Percent of pork loins having satisfactory bone color after 4 to 6 days at 30° F. to 32° F. |
|---|---|---|
| None | "Butcher wrap" [a] | 26 |
| Do | Plastic film wrap [b] | 67 |
| Mineral oil without added antioxidants. | Resinite RMT 67 | 73 |
| Edible oil coating containing approved level of added antioxidants.[c] | Plastic film wrap [b] | 100 |

[a] "Butcher wrap." 30-pound bleached kraft paper dry paraffin waxed to 35 pounds.
[b] Plastic film wrap. The following films were used: (1) Cross-linked polyethylene; (2) Polyvinylidene chloride; (3) Polyvinylchloride; (4) Nylon-saram coated polyethylene; (5) Polyethylene.
[c] Edible oil containing antioxidants—Corn oil, olive oil, cottonseed oil, peanut oil, safflower oil, soybean oil, sesame oil, mineral oil.

Similar tests made with different red meats, including retail cuts of pork, beef and lamb, demonstrates that the red color of the freshly cut bone surface can be protected against discoloration by the application of the edible coatings mentioned above containing naturally present or FDA approved added antioxidant mixtures before the meats are wrapped for distribution and sale. Best results are obtained when the freshly cut bone surface is coated immediately after the sawing or cleaver operation.

The above described methods for protecting the natural red color of freshly cut bone surfaces in red meat one-half carcasses, quarters, primal cuts, wholesale cuts and retail cuts are particularly beneficial when the meat is (1) hard-chilled, such as practiced in the shipment of chilled beef quarters and cuts; (2) when carcasses or one-half carcasses are "quick-chilled" or "snap-chilled" using cold air blast, carbon dioxide, nitrogen or Freon, which results in lowering the temperature of the cut bone surface to the eutectic temperature as described above; (3) when carcasses or cuts are frozen; and (4) notable color protection of the cut bone surface is also achieved when the meat is held under normal refrigeration without freezing.

Having described our invention as illustrated by the examples and descriptions set out herein, it is our intention that the invention not be limited by any of the details given in the examples or descriptions unless otherwise specified, but rather be broadly construed within the spirit and scope as set forth in the following claims.

We claim:

1. A method for preventing oxidation of the natural heme pigments in the bone marrow of cut bone surfaces in fresh and frozen meat cuts comprising the steps of coating the freshly cut bone surfaces of freshly slaughtered carcasses prior to chilling with an edible oil containing antioxidants in predetermined amounts, providing the meat cuts from said carcasses, additionally coating the freshly cut bone surfaces of the meat cuts with said edible oil, and wrapping the meat cuts in a plastic film and chilling the wrapped cuts.

2. In the method of continuously processing hogs which comprises slaughtering the hogs, eviscerating the hog carcasses, splitting and washing the carcasses, quick chilling the carcasses, and cutting the carcasses into portions, a method for preventing oxidation of the natural heme pigments in the bone marrow of cut bone surfaces including the steps of coating the freshly cut bone surfaces with an edible oil containing antioxidants in predetermined amounts prior to the quick chilling of the carcasses, additionally coating the freshly cut bone surfaces of the portions with said oil, and wrapping the portions in a plastic film and chilling the wrapped portions.

3. The method of claim 2 wherein said edible oil is a lard oil.

References Cited

UNITED STATES PATENTS

| 2,819,975 | 1/1958 | Letney | 99—169 |
| 2,905,561 | 9/1959 | Barnett et al. | 99—174 |

FOREIGN PATENTS

| 229,036 | 2/1925 | Great Britain. |

HYMAN LORD, Primary Examiner

U.S. Cl. X.R.

426—302, 310, 328